Feb. 11, 1936.　　　　J. DOLZA　　　　2,030,813

THRUST BEARING

Filed Feb. 25, 1933

Inventor
John Dolza
By Blackmore, Spencer & Flint
Attorney

Patented Feb. 11, 1936

2,030,813

UNITED STATES PATENT OFFICE 2,030,813

THRUST BEARING

John Dolza, Flint, Mich., assignor, by mesne assignments, to General Motors Corporation, Detroit, Mich., a corporation of Delaware Application February 25, 1933, Serial No. 658,502

5 Claims. (Cl. 192—110)

This invention relates to bearings and has been designed as an improvement in the throwout bearing for clutches of motor vehicles.

For the purpose of preventing clutch chatter and to insure smooth engagement of the friction elements of a conventional motor vehicle friction clutch, it is necessary to provide uniformly distributed pressure to the clutch facings. This requires equalized spring load and accurate adjustment of the conventional rotating fingers by which the applied force is transmitted to the pressure plate.

The present invention has for its object the provision of means for the automatic compensation for errors in manufacture or in the adjustment of the parts of the clutch.

More specifically the invention resides in a self-aligning bearing through which the force which is applied to release the clutch operates through the rotating fingers which move the pressure plate.

The invention also has as its object a novel structural unidirectional thrust bearing which renders it useful elsewhere than in the particular relation of parts for which it has been primarily designed.

The accompanying drawing illustrates the invention as applied to a motor vehicle clutch.

Figures 1, 2:
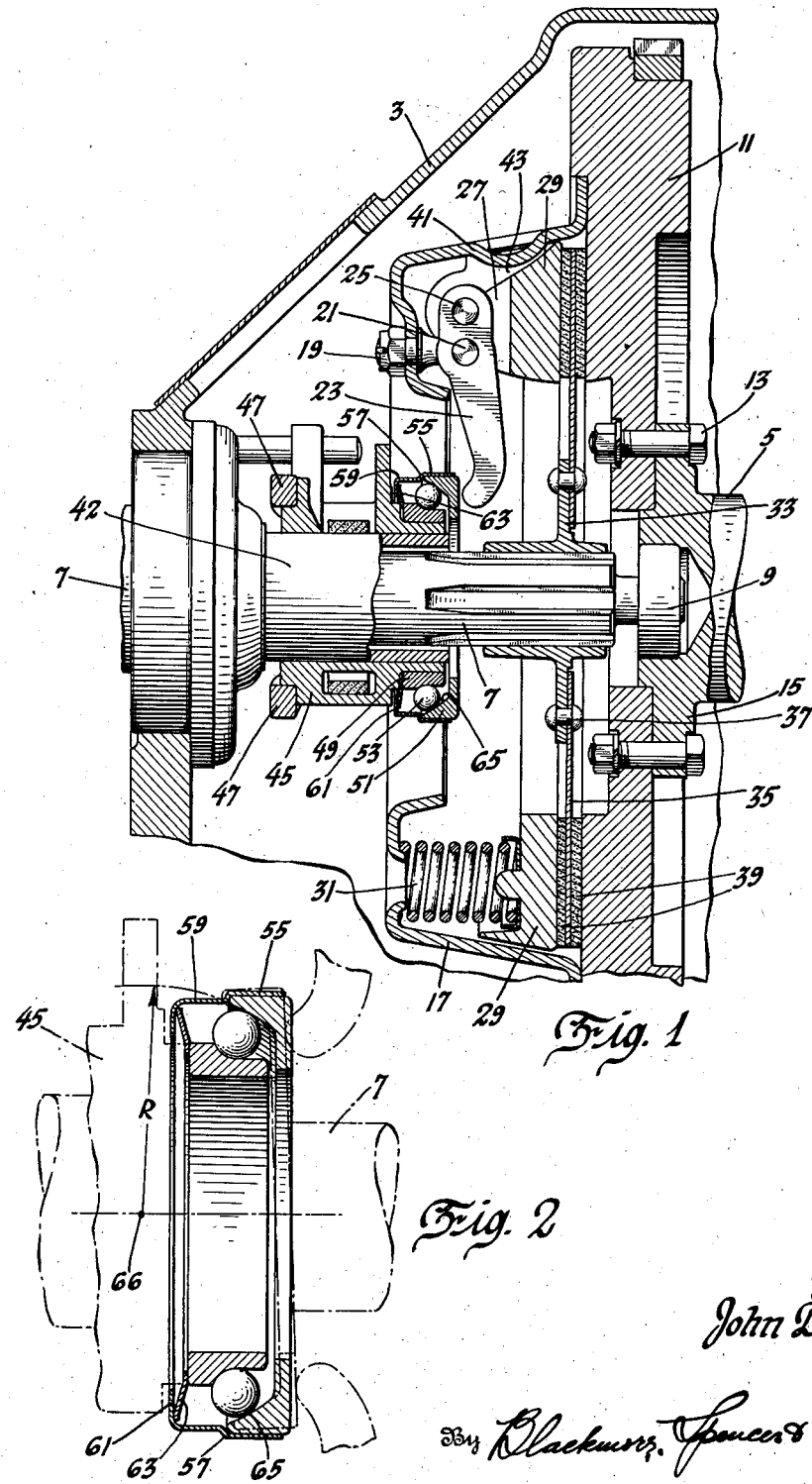
Fig. 1 shows in transverse section a substantially conventional clutch embodying the invention.
Fig. 2 is a similar section on a larger scale of the bearing.

In the drawing, numeral 3 represents a housing for the clutch. Entering this housing is the engine shaft 5. The driven or output shaft is represented by numeral 7, and this shaft is shown as provided with a pilot bearing at 9 in the opening at the end of shaft 5.

Numeral 11 represents the flywheel which is secured by bolts 13 to the flange 15 on shaft 5. Carried by the flywheel is an abutment plate or member 17. At 19 is shown one of several studs distributed about the member 17. Each stud 19 is provided with a pivot 21 for the rotatable support of a finger 23. Radially outward from the pivot 21 the finger 23 is pivoted at 25 between lugs 27 extending axially from the pressure plate 29. Suitable springs, one of which is shown at 31, are seated on the abutment plate and engage the pressure plate. These springs are designed to move the pressure plate toward the flywheel. Splined to slide on the driven shaft is the hub 33 of a driven clutch plate 35, the latter secured to the hub by fastening means 37. Preferably this driven plate carries adjacent its periphery facings of any preferred material as shown at 39. It will be understood that springs 31 operate to cause the driven plate 35 to be gripped between the flywheel face and the pressure plate to effect a rotation of the driven shaft with the engine shaft. The pressure plate may be held from rotation relative to the flywheel by any suitable means. In the illustrated embodiment of the invention there is a portion 41 depressed from the plate 17 and entering a recess 43 provided in the pressure plate. Since the abutment plate 17 rotates with the flywheel the pressure plate also so rotates because of this connection.

Slidable and rotatable on a hollow hub 42 surrounding the output shaft 7 is a sleeve 45. This sleeve is actuated by a fork, the ends of which are represented on the drawing by numeral 47. Between the sleeve 45 and the radially inner ends of fingers 23 is the novel throwout bearing which constitutes the essential part of this invention.

To make sure of smooth clutch engagement and to avoid chatter, uniform distribution of pressure is needed. This is in substance effected by springs 31 which as usual are distributed symmetrically about the abutment plate, and the fingers 23 are intended to be accurately adjusted. To compensate for any errors in manufacture or adjustment, the bearing is so made that the normally coaxial rotation of its races may be automatically disturbed. To that end the following construction is employed. The inner race 49 seats on the sleeve 45, engaging both an annular face and a radial face as shown by the drawing. The outer race 51 is spaced from the inner race by a series of balls marked 53. The outer race engages the fingers 23. A retaining member in the form of a stamped ring shown at 55 is carried by the outer race. It has a shoulder 57 adjacent the race and from the shoulder extends axially as at 59 and then radially as at 61, the part 61 located adjacent a face of the sleeve and beyond the inner race. Within the retainer is a spring disc 63 outwardly engaging the retainer adjacent the junction of the walls 59 and 61 and inwardly engaging the inner race as shown in the drawing. It will be understood that this spring tends to hold the races in coaxial relation. The balls are shown as seated in a circular recess 50 formed in the inner race. The outer race has a spherical face as at 65, this face constructed with a center at a point such as 66. This design permits a limited movement of the axis of the outer race relative to the inner race. The bearing therefore constitutes a uni-directional thrust bearing wherein the normally coaxial relation of the races may be disturbed to accommodate for errors in manufacture or errors in adjustment.

In operation, the thrust from the sleeve operates from the inner race through the balls and the outer race to the fingers. In the event of any inaccuracy of manufacture or faulty adjustment of the fingers, the outer race will accommodate itself by a movement about its center 66, it axis thus being distorted from coaxial relation with the inner race, this movement of the outer race being resisted by the compression of the spring 63 which normally tends to hold the races in coaxial relation.

It will be understood that the bearing is useful in other relations, although it has been designed especially for use in connection with a motor vehicle clutch as described above.

I claim:

1. A bearing having an outer race with a spherical surface, an inner race having a circular ball-receiving recess formed therein, a plurality of balls in said recess engaging said spherical surface, a retainer carried by said outer race and surrounding said inner race, yielding means within said retainer and yieldingly engaging said retainer and inner race, said yielding means operable to normally hold said races in coaxial relation.

2. The invention defined by claim 1 together with movable clutch elements engaged by said races whereby errors in manufacture or adjustment of said movable elements are compensated by yieldably resisted relative movements of said races.

3. The invention defined by claim 1 together with friction clutch elements including a pressure plate, an abutment, springs to engage said abutment and pressure plate and operable to actuate said friction clutch, fingers operably related to said pressure plate and outer race, and an axially movable member engaging said inner race whereby inaccuracies of adjustment are compensated by relative movements of said bearing race.

4. A uni-directional thrust bearing having races, one race having a circular ball-receiving recess, the other race having a spherical surface, anti-friction means in said recess and engaging said surface, a retainer carried by one of said races, yielding means carried by said retainer and yieldingly engaging the other race to maintain coaxial alignment of said races.

5. The invention defined by claim 4, said yielding means being in the form of an annular disc.

JOHN DOLZA.